J. M. WATERS.
Cutter-Heads.

No. 151,067.

Patented May 19, 1874.

UNITED STATES PATENT OFFICE.

JABEZ M. WATERS, OF CINCINNATI, OHIO.

IMPROVEMENT IN CUTTER-HEADS.

Specification forming part of Letters Patent No. 151,067, dated May 19, 1874; application filed October 18, 1873.

*To all whom it may concern:*

Be it known that I, JABEZ M. WATERS, of Cincinnati, county of Hamilton and State of Ohio, have invented an Improvement in Cutter-Heads, of which the following is a specification:

My improvement consists in placing a hollow recess or chamber behind the chisel of a revolving cutter-head.

By means of this chamber a tenon with a beveled shoulder can be turned on the end of a stick of wood, the tenon being continuous with the length of the stick and the shoulder oblique to it.

Previously to my invention it has been found necessary to cut the tenon at right angles to the bevel and across the grain of the wood, thus making a much weaker tenon than the one which is cut by my improved chuck.

Figure 1:
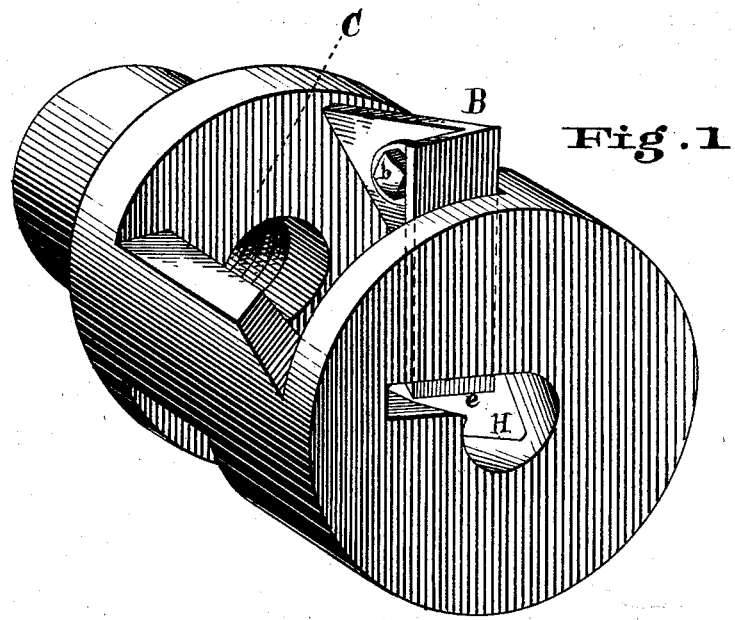
Figure 2:
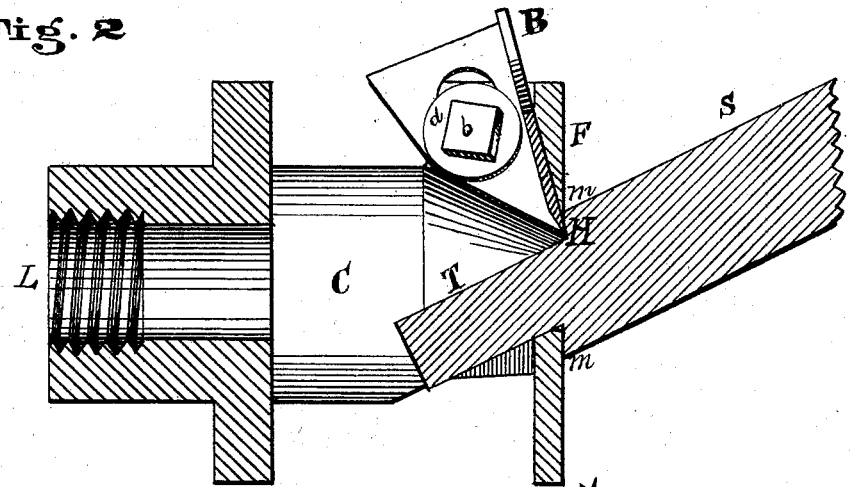

In the drawings, Figure 1 is a perspective view of my improved chuck. Fig. 2 is a longitudinal section of the same, and also of a stick on which a tenon is being cut.

In both figures, B represents the chisel, and C the hollow chamber behind it. The chisel is adjustable by means of washers $d$ and screw $b$, or by any equivalent contrivances, by means of which the cutting-edge may be raised or lowered and pushed in and out with reference to the revolving axis of the chuck, so as to cut a larger or smaller tenon, as desired.

When the chuck is to be used, it is first screwed to the mandrel, at L, and made to revolve. The end of the stick S is then brought up against the hole H in the face F of the chuck, at the angle which it is desired that the required shoulder shall make with the tenon. As the chuck revolves the knife-edge cuts around the surface of the stick, leaving a tenon, T. As fast as this tenon is turned out it enters through the hole H into the chamber C in an oblique direction, as shown in Fig. 2, the result of which is that the tenon is formed continuous in direction with the length of the stick at the same time that the shoulder $m$ $m$ is cut obliquely to it.

Thus is secured a straight tenon with a beveled shoulder, and herein consists the peculiar advantage claimed for my improvement.

By employing a suitable chisel, my improved chuck may be used for cutting a tenon in the manner described on metal as well as on wood.

I claim as my invention—

In a revolving chuck or cutter-head, a chamber or hollow space, so shaped and located with reference to the cutting-edge of the chisel, that a tenon with a beveled shoulder may be turned by the chisel on a piece of wood or metal, the tenon being oblique to the beveled shoulder and continuous in direction with the piece of material on which it is turned, substantially as shown and described in the foregoing specification.

JABEZ M. WATERS.

Witnesses:
JOHN E. HATCH,
JEREMIAH F. TWOHIG.